United States Patent
Yoshizaki et al.

(10) Patent No.: US 11,192,346 B2
(45) Date of Patent: Dec. 7, 2021

(54) LAMINATED BODY CONTAINING FIBER-REINFORCED RESIN, FIBER-REINFORCED COMPOSITE RESIN MATERIAL AND METHODS OF PRODUCING THESE

(71) Applicant: FURUKAWA ELECTRIC CO., LTD., Tokyo (JP)

(72) Inventors: Motoko Yoshizaki, Tokyo (JP); Makiko Nakano, Tokyo (JP); Yukihiro Ikura, Tokyo (JP); Jirou Hiroishi, Tokyo (JP); Isao Tomomatsu, Tokyo (JP); Yousuke Kokubo, Tokyo (JP); Yoichiro Negishi, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/664,181

(22) Filed: Oct. 25, 2019

(65) Prior Publication Data
US 2020/0055294 A1    Feb. 20, 2020

Related U.S. Application Data (63) Continuation of application No. PCT/JP2018/017415, filed on May 1, 2018.

(30) Foreign Application Priority Data

May 2, 2017  (JP) .............................. JP2017-091843

(51) Int. Cl.
*B32B 27/12*    (2006.01)
*B32B 5/12*    (2006.01)
(Continued)

(52) U.S. Cl.
CPC ................ *B32B 27/12* (2013.01); *B32B 5/12* (2013.01); *B32B 27/32* (2013.01); *B32B 37/06* (2013.01);
(Continued)

(58) Field of Classification Search
CPC ........ B32B 2037/1223; B32B 2250/42; B32B 2260/021; B32B 2260/046;
(Continued)

(56) References Cited

U.S. PATENT DOCUMENTS

| 5,047,263 A | 9/1991 | Glemet |
| 2006/0110599 A1* | 5/2006 | Honma ............. B29C 66/73752 428/413 |

(Continued)

FOREIGN PATENT DOCUMENTS

| CN | 86 1 02870 A | 9/1986 |
| CN | 106414056 A | 2/2017 |

(Continued)

OTHER PUBLICATIONS

Chinese Office Action for Chinese Application No. 201880010572.4, dated Sep. 2, 2020, with English translation of the Office Action.

(Continued)

*Primary Examiner* — Lawrence D Ferguson
(74) *Attorney, Agent, or Firm* — Birch, Stewart, Kolasch & Birch, LLP (57) ABSTRACT

A laminated body, containing a fiber-reinforced resin, in which a fiber-reinforced thermoplastic resin layer (1) containing fiber bundle of reinforcing fibers and a first thermoplastic resin, and a resin layer (2) containing a second thermoplastic resin, are alternately laminated, to form the fiber-reinforced resin, and the ratio of the indentation elastic modulus $E_{IT\text{-}B}$ of the first thermoplastic resin portion of the laminated body with respect to the indentation elastic modu- (Continued)

lus $E_{IT\text{-}C}$ of the second thermoplastic resin is 1.5 or more and 5.0 or less;

a fiber-reinforced composite resin material; and a method of producing these.

12 Claims, 1 Drawing Sheet

(51) Int. Cl.
  *B32B 27/32* (2006.01)
  *B32B 37/06* (2006.01)
  *B32B 38/08* (2006.01)
  *C08J 5/04* (2006.01)

(52) U.S. Cl.
  CPC ............... *B32B 38/08* (2013.01); *C08J 5/042* (2013.01); *B32B 2250/42* (2013.01); *B32B 2260/021* (2013.01); *B32B 2260/046* (2013.01); *B32B 2262/106* (2013.01); *B32B 2313/04* (2013.01); *B32B 2323/10* (2013.01); *C08J 2323/12* (2013.01)

(58) Field of Classification Search
  CPC .......... B32B 2262/106; B32B 2313/04; B32B 2323/10; B32B 27/12; B32B 27/32; B32B 37/06; B32B 38/08; B32B 5/12; C08J 2323/12; C08J 2351/06; C08J 5/042; C08J 5/24
  See application file for complete search history.

(56) References Cited

U.S. PATENT DOCUMENTS

| 2006/0182976 | A1* | 8/2006 | Yamakawa | ............ | B32B 25/14 |
| | | | | | 428/421 |
| 2012/0295604 | A1 | 11/2012 | Mnyauch et al. | | |
| 2017/0217140 | A1 | 8/2017 | Han et al. | | |

FOREIGN PATENT DOCUMENTS

| JP | 61-236832 A | 10/1986 |
| JP | 62-57428 A | 3/1987 |
| JP | 4-239034 A | 8/1992 |
| JP | 10-278184 A | 10/1998 |
| JP | 2013-189634 A | 9/2013 |
| JP | 2016-188290 A | 11/2016 |
| JP | 2017-8237 A | 1/2017 |
| TW | 201637829 A | 11/2016 |
| WO | WO 2016/018081 A1 | 2/2016 |

OTHER PUBLICATIONS

International Search Report (PCT/ISA/210) issued in PCT/JP2018/017415, dated Jul. 31, 2018.

Written Opinion (PCT/ISA/237) issued in PCT/JP2018/017415, dated Jul. 31, 2018.

Chinese Office Action for Chinese Application No. 201880010572.4, dated Mar. 24, 2021, with English translation.

Chinese Office Action for Chinese Application No. 201880010572.4, dated Jul. 26, 2021, with an English translation.

Taiwanese Office Action and Search Report for Taiwanese Application No. 107114769, dated Sep. 16, 2021, with English translation.

* cited by examiner

LAMINATED BODY CONTAINING FIBER-REINFORCED RESIN, FIBER-REINFORCED COMPOSITE RESIN MATERIAL AND METHODS OF PRODUCING THESE

CROSS-REFERENCE TO RELATED APPLICATIONS

This application is a Continuation of PCT International Application No. PCT/JP2018/017415 filed on May 1, 2018, which claims priority under 35 U.S.C. § 119 (a) to Japanese Patent Application No. 2017-091843 filed in Japan on May 2, 2017. Each of the above applications is hereby expressly incorporated by reference, in its entirety, into the present application.

TECHNICAL FIELD

The present invention relates to a laminated body containing a fiber-reinforced resin, in more particular, relates to a laminated body containing a fiber-reinforced resin suitable for an automobile member, a structural member, a reinforcing member, or the like. Furthermore, the present invention relates to a fiber-reinforced composite resin material used for the laminated body including a fiber-reinforced resin. Furthermore, the present invention relates to a method of producing the laminated body and a fiber-reinforced composite resin material each including a fiber-reinforced resin.

BACKGROUND ART

Composite resin materials obtained by reinforcing a resin with a reinforcing fiber (also referred to as fiber-reinforced composite resin material) are lightweight compared to metals such as iron and aluminum and have high mechanical strength. In view of these characteristics, in recent years, fiber-reinforced composite resin materials are used in applications such as applications in the aerospace field, automobiles, sports goods, and personal computer housings.

Among them, fiber-reinforced composite resin materials that use thermoplastic resins have a feature of exhibiting excellent recyclability and impact resistance, and thus attention has been paid to the materials.

For example, in Patent Literature 1, a fiber-reinforced composite material that uses two kinds of thermoplastic resins having different melt flow rates is described. Particularly, it is described that excellent effects are obtained by using a polyamide resin as the thermoplastic resin. Furthermore, in Patent Literature 2, a composite molded article formed by fusion bonding a thermoplastic resin layer on at least one surface of a one-directional thermoplastic prepreg is described. It is considered that this composite molded article does not require a surface treatment of a one-directional thermoplastic prepreg containing a thermoplastic resin, facilitates the adhesion to another resin material containing a thermoplastic resin so that delamination at the interface does not occur, and can realize high bending strength of the composite molded article as a whole.

CITATION LIST

Patent Literatures

Patent Literature 1: JP-A-2013-189634 ("JP-A" means unexamined published Japanese patent application)
Patent Literature 2: JP-A-2016-188290

SUMMARY OF INVENTION

Technical Problem

In recent years, development of a resin material having superior impact resistance, which can be applied to impact energy absorbing components for automobiles and the like, is desirable. However, the fiber-reinforced composite material described in Patent Literature 1 does not necessarily have sufficient impact resistance. Furthermore, regarding the composite molded article described in Patent Literature 2, it still cannot be said that impact resistance is sufficient, and further enhancement is required.

Thus, it is an object of the present invention to provide a laminated body formed by laminating a fiber-reinforced composite resin material and exhibiting excellent impact resistance. Furthermore, it is another object of the present invention to provide a fiber-reinforced composite resin material suitable as a constituent material of the laminated body described above. Furthermore, it is another object of the present invention to provide a method of producing the laminated body and the fiber-reinforced composite resin material.

Solution to Problem

The present inventors have repeated to conduct intensive studies in order to solve the above problem. As a result, the inventors found that when a fiber-reinforced composite resin material having a layer containing a second thermoplastic resin welded on at least one surface of a fiber-reinforced thermoplastic resin layer containing a fiber bundle of reinforcing fibers and a first thermoplastic resin is produced, sheets of the resin material thus obtained are subjected to press forming or the like to obtain a laminated body, and the ratio of the indentation elastic modulus of the first thermoplastic resin to the indentation elastic modulus of the second thermoplastic resin in this laminated body is adjusted to a particular value or greater, a laminated body having excellent impact resistance can be provided. The present invention was completed by repeatedly conducting further investigations based on these findings.

The present invention has been completed by these findings.

<1>

A laminated body, containing a fiber-reinforced resin, wherein a fiber-reinforced thermoplastic resin layer (1) comprising a fiber bundle of reinforcing fibers and a first thermoplastic resin, and a resin layer (2) containing a second thermoplastic resin, are alternately laminated, to form the fiber-reinforced resin, and wherein the ratio of the indentation elastic modulus $E_{IT-B}$ of the first thermoplastic resin portion of the laminated body with respect to the indentation elastic modulus $E_{IT-C}$ of the second thermoplastic resin portion is 1.5 or more and 5.0 or less.

<2>

The laminated body containing a fiber-reinforced resin as described in the item <1>, wherein the ratio of the thickness of the resin layer (1) with respect to the thickness of the resin layer (2) is 2.0 to 6.0.

<3>

The laminated body containing a fiber-reinforced resin as described in the item <1> or <2>, wherein the value of the bending strength with respect to the fiber volume fraction in the laminated body is 10 MPa/vol % or more.

<4>

The laminated body containing a fiber-reinforced resin as described in any one of the items <1> to <3>, wherein the first thermoplastic resin and the second thermoplastic resin each are one kind or two or more kinds of resins selected from the group consisting of a vinyl chloride resin, a vinylidene chloride resin, a vinyl acetate resin, a polyvinyl alcohol resin, a polystyrene resin, an acrylonitrile-styrene resin, an acrylonitrile-butadiene-styrene resin, an acrylic resin, a methacrylic resin, a polyethylene resin, a polypropylene resin, a polyamide resin, a polyacetal resin, a polycarbonate resin, a polyarylate resin, a polyphenylene ether resin, a polyphenylene sulfide resin, a polysulfone resin, a polyethersulfone resin, a polyether ether ketone resin and a polylactic acid resin.

<5>

The laminated body containing a fiber-reinforced resin as described in the item <4>, wherein the first thermoplastic resin is a graft-modified polypropylene resin, and the second thermoplastic resin is a polypropylene resin.

<6>

The laminated body containing a fiber-reinforced resin as described in the item <5>, wherein the indentation elastic modulus $E_{IT-B}$ of the first thermoplastic resin portion is 2500 N/mm² or more and 7000 N/mm² or less, and the indentation elastic modulus $E_{IT-C}$ of the second thermoplastic resin portion is 1500 N/mm² or more and 3000 N/mm² or less.

<7>

The laminated body containing a fiber-reinforced resin as described in the item <5> or <6>, wherein the Charpy impact strength of the laminated body is 100 kJ/m² or more and 200 kJ/m² or less.

<8>

The laminated body containing a fiber-reinforced resin as described in any one of the items <1> to <7>, wherein the reinforcing fibers are carbon fibers.

<9>

The laminated body as described in any one of the items <1> to <8>, wherein an organic filler is dispersed in the fiber-reinforced thermoplastic resin layer (1).

<10>

The laminated body as described in the item <9>, wherein the organic filler is cellulose.

<11>

A fiber-reinforced composite resin material to be used for the formation of the laminated body containing a fiber-reinforced resin as described in any one of the items <1> to <10>, containing:

a fiber-reinforced thermoplastic resin layer (1a) containing a fiber bundle of reinforcing fibers and a first thermoplastic resin; and a resin layer (2a) containing a second thermoplastic resin on at least one surface of the fiber-reinforced thermoplastic resin layer (1a).

<12>

A method of producing the laminated body as described in any one of the items <1> to <10>, containing a step of fusion bonding of both of fiber-reinforced composite resin materials as described in the item <11>.

<13>

The method of producing the fiber-reinforced composite resin material as described in the item <11>, containing the steps of:

impregnating a fiber bundle of reinforcing fibers with a first thermoplastic resin, thereby obtaining a fiber-reinforced thermoplastic resin layer containing the fiber bundle of reinforcing fibers and the first thermoplastic resin; and fusion bonding a second thermoplastic resin on at least one surface of the fiber-reinforced thermoplastic resin layer thus obtained.

Advantageous Effects of Invention

The laminated body containing a fiber-reinforced resin of the present invention has excellent impact resistance. Furthermore, the fiber-reinforced composite resin material of the present invention can be used for the formation of a laminated body containing a fiber-reinforced resin having excellent impact resistance. In addition, the methods of producing a laminated body containing a fiber-reinforced resin and a fiber-reinforced composite resin material of the present invention can efficiently produce a laminated body containing a fiber-reinforced resin and a fiber-reinforced composite resin material having the above-described performances. Furthermore, the fiber fraction as the fiber-reinforced composite resin material can be arbitrarily adjusted, and the cost reduction can be attempted through selection of the thermoplastic resin.

Other and further features and advantages of the invention will appear more fully from the following description, appropriately referring to the accompanying drawings.

MODE FOR CARRYING OUT THE INVENTION

In this specification, a numeral range represented by "to" means that the numerical values described before and after "to" are included as the lower limit value and the higher limit value, respectively.

<<Laminated Body Containing Fiber-Reinforced Resin>>

The laminated body containing a fiber-reinforced resin of the present invention (hereinafter, also simply referred to as "laminated body") has a laminated structure in which a fiber-reinforced thermoplastic resin layer (hereinafter, also simply referred to as "resin layer (1)") containing a fiber bundle of reinforcing fibers and a first thermoplastic resin (hereinafter, referred to as resin (1)) and a resin layer (hereinafter, also simply referred to as "resin layer (2)") containing a second thermoplastic resin (hereinafter, also referred to as resin (2)) are alternately laminated. The laminated body of the present invention is laminated integrated.

Figure 1:
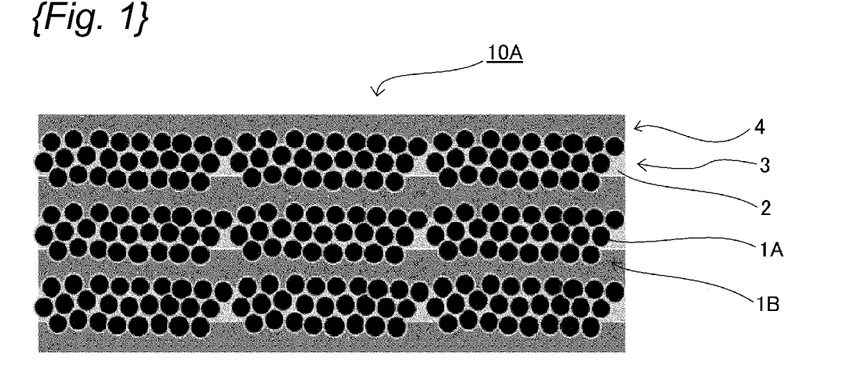
FIG. 1 is a schematic longitudinal section view showing a structure according to one embodiment of a laminated body containing a fiber-reinforced resin of the present invention.

FIG. 1 is a schematic longitudinal section view showing a structure according to one embodiment of the laminated body of the present invention.

As shown in FIG. 1, the laminated body 10A of the present invention has a laminated structure in which fiber-reinforced thermoplastic resin layer 3 containing a fiber bundle 1B in which a plurality of reinforcing fibers 1A has been lined up in a predetermined direction (the bundled state is not shown in FIG. 1) and a first thermoplastic resin 2, and a resin layer 4 containing a second thermoplastic resin are laminated.

Here, the laminated body 10A of the present invention may be composed of any layers as long as the fiber-reinforced thermoplastic resin layer 3 and the resin layer 4 are alternately laminated. Furthermore, the outermost layer of the laminated body 10A of the present invention may be either the fiber-reinforced thermoplastic resin layer 3 or the resin layer 4. However, as shown in FIG. 1, it is preferable that all of the outermost layers are the resin layers 4, from the viewpoint that fuzzing of the fibers at the sheet surface can be prevented.

(Indentation Elastic Modulus)

In the laminated body of the present invention, the ratio of the indentation elastic modulus $E_{IT-B}$ of the first thermoplastic resin portion with respect to the indentation elastic modulus $E_{IT-C}$ of the second thermoplastic resin portion (hereinafter, also simply referred to as "$E_{IT-B}/E_{IT-C}$") is 1.5 or more and 5.0 or less.

The indentation elastic moduli $E_{IT-B}$ and $E_{IT-C}$ of the respective resin portions of the laminated body are measured according to ISO14577 using a sample in which a cross-section in a direction perpendicular to the fiber direction of the fiber bundle in the laminated body (hereinafter, simply referred to as "fiber perpendicular direction cross-section") serves as a measurement face.

Regarding the details, measurement can be made by the method described in Examples that will be described below.

Regarding the laminated body of the present invention, excellent impact resistance is obtained when the laminated body has a laminated structure in which the resin layer (1) and the resin layer (2) are alternately laminated, and the ratio $E_{IT-B}/E_{IT-C}$, which represents the ratio of the indentation elastic moduli of the resin portions of the laminated body, has a particular value or greater. This is speculated to be because as the resin layer (2) having a low elastic modulus absorbs impact, resin cracking at the time of destruction is reduced.

Figure 2:
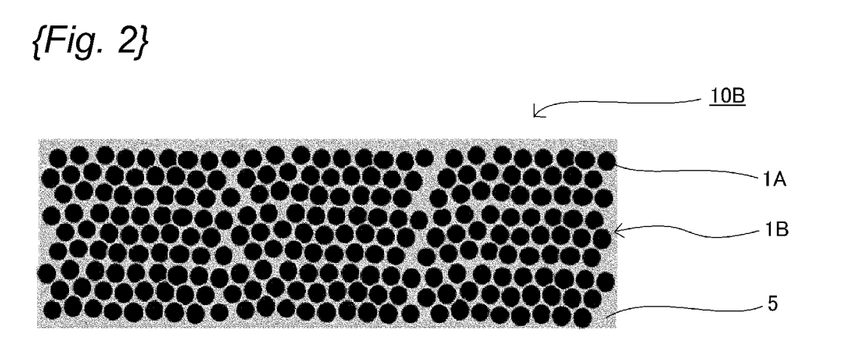
FIG. 2 is a schematic longitudinal section view showing a structure according to one embodiment of a laminated body containing a fiber-reinforced resin of the comparison.

In this regard, for example, a laminated body 10B formed using a conventional CFRTP (carbon fiber-reinforced thermoplastic resin) prepreg does not have a layer that can be called resin layer, between the prepreg layers, as shown in FIG. 2, and the resin 5 present between the fiber bundle 1B of the reinforcing fibers 1A and the resin 5 present between the prepreg layers are such that their indentation elastic moduli do not satisfy the ratio as defined in the present invention. Therefore, a laminated body formed using a conventional CFRTP prepreg has lower impact resistance when impact is exerted thereon.

In regard to the laminated body of the present invention, the ratio $E_{IT-B}/E_{IT-C}$ is 1.5 or more, preferably 1.8 or more, and more preferably 2.1 or more, from the viewpoint of reducing resin cracking at the time of destruction. There are no particular limitations on the upper limit; however, from the viewpoint that when the elastic modulus of the resin layer (1) is too high, the laminated body is likely to be subjected to destruction induced by impact, the ratio is 5.0 or less, and preferably 2.5 or less.

Meanwhile, regarding specific values of the indentation elastic moduli of the respective resin portions of the laminated body, from the viewpoint of processability of the laminated body, it is preferable that the $E_{IT-B}$ is 2500 N/mm² or more, and the $E_{IT-C}$ is 1500 N/mm² or more; it is more preferable that the $E_{IT-B}$ is 3000 N/mm² or more, and the $E_{IT-C}$ is 1700 N/mm² or more; it is further preferable that the $E_{IT-B}$ is 3500 N/mm² or more, and the $E_{IT-C}$ is 1900 N/mm² or more; and it is particularly preferable that the $E_{IT-B}$ is 4000 N/mm² or more, and the $E_{IT-C}$ is 2000 N/mm² or more. With respect to the upper limits, $E_{IT-B}$ is preferably 7000 N/mm² or less, and $E_{IT-C}$ is preferably 3000 N/mm² or less.

Various members constituting the laminated body will be explained below.

<Fiber-Reinforced Thermoplastic Resin Layer (Resin Layer (1))>

(Fiber Bundle (A) of Reinforcing Fibers)

In the laminated body of the present invention, the fiber-reinforced thermoplastic resin layer contains a fiber bundle of reinforcing fibers. This fiber bundle is a fiber bundle in which a plurality of reinforcing fibers has been lined up in a predetermined direction (preferably one direction).

The fiber bundle-constituting reinforcing fiber is not particularly limited, but includes an inorganic fiber, an organic fiber, a metal fiber, or a fiber material composed of a mixture of these fibers. Specific examples include a carbon fiber, a graphite fiber, a silicon carbide fiber, an alumina fiber, a tungsten carbide fiber, a boron fiber, a glass fiber, a basalt fiber, an aramid fiber, a high-density polyethylene fiber, a polyamide fiber, and a polyester fiber.

Among these, a carbon fiber is preferred because the carbon fiber is very excellent in both strength and elastic modulus. Examples of the carbon fiber include a PAN (polyacrylonitrile)-series carbon fiber and a pitch-series carbon fiber.

From the viewpoint of the number of filaments constituting the fiber bundle, the fiber bundle is classified into large tow, regular tow or the like. The regular tow is characterized by the number of filaments that is 24,000 or less, while the number of filaments in the large tow is 40,000 or more. Due to these characteristics, the regular tow is used in the aerospace field or for sport goods because of high mechanical performance, while the large tow is used for industrial materials because of a low cost.

As for the fiber bundle, from the viewpoint of a balance between cost or productivity and strength or elastic modulus, it is preferable to use a large tow of the PAN-series carbon fiber.

As the fiber bundle, generally, the fiber diameter of the reinforcing fibers is suitably 5 to 20 μm, preferably 4 to 8 μm, and more preferably 5 to 7 μm.

As one of factors which decrease the strength of the carbon fiber, a structural defect of the fiber itself is exemplified. Since the finer fiber is less likely to cause a defect, the use of a carbon fiber having a fine fiber size allows improvement in the strength of the laminated body and the fiber-reinforced composite resin material described later, so that it is preferable to use such carbon fiber.

The fiber bundle may be a woven fabric, or may be a so-called UD (Uni-Direction) sheet obtained by arranging the fiber bundle in one direction into a sheet form. In the case of the UD sheet, the UD sheets can be used as a laminated body in which multiple layers of the UD sheet are laminated such that the fiber arrangement directions of the respective layers intersect one another (for example, alternately laminated in orthogonal directions). Examples of the reinforcing fiber sheet include a sheet obtained by mixing a large number of reinforcing fibers in one direction; two-directionally woven fabrics such as a plain fabric and a twilled fabric; a multi-axially woven fabric; a nonwoven fabric, a mat, knit, plaited cord, and paper made from reinforcing fibers. Among these, when a unidirectionally aligned sheet obtained by using reinforcing fibers as continuous fibers to form into a sheet form, a two-directionally woven fabric, or a multi-axially woven fabric base material is used, a fiber-reinforced composite material having superior mechanical characteristics is obtained, and therefore, it is preferable.

Figure 3:
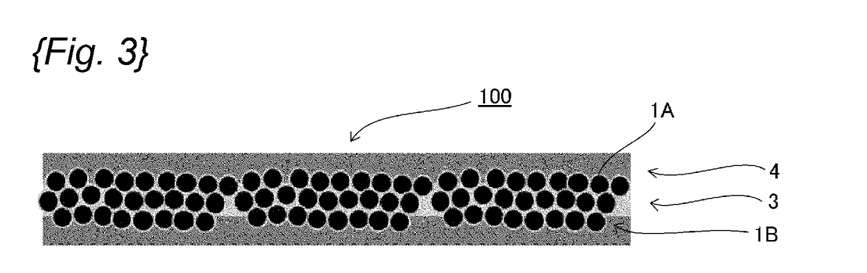
FIG. 3 is a schematic longitudinal section view showing a structure according to one embodiment of a fiber-reinforced composite resin material of the present invention.

Note that, in FIGS. 1 and 3, an example of the fiber bundle 1B in a fiber-spread state (reinforcing fibers 1A have been thinly arranged in the width direction) is shown by a schematic sectional view. For this reason, the cross-sectional shape of the fiber bundle 1B viewed from the cross section of the laminated body 10A of FIG. 1 and the fiber-reinforced composite resin material 100 of FIG. 3 is recognized as a rectangle, when taken as a whole. However, the cross-sectional shape of the fiber bundle 1A is not particularly limited and, for example, may be a circle or a rectangle.

(First Thermoplastic Resin (B))

In the laminated body of the present invention, the fiber-reinforced thermoplastic resin layer contains a first thermoplastic resin.

Examples of the first thermoplastic resin can include one kind or more or more kinds of resins selected from the group consisting of a vinyl chloride resin, a vinylidene chloride resin, a vinyl acetate resin, a polyvinyl alcohol resin, a polystyrene resin, an acrylonitrile-styrene resin (an AS resin), an acrylonitrile-butadiene-styrene resin (an ABS resin), an acrylic resin, a methacrylic resin, a polyethylene resin, a polypropylene resin, a polyamide resin (e.g., a polyamide 6 resin, a polyamide 11 resin, a polyamide 12 resin, a polyamide 46 resin, a polyamide 66 resin, and a polyamide 610 resin), a polyacetal resin, a polycarbonate resin, a polyethylene terephthalate resin, a polyethylene naphthalate resin, a polybutylene terephthalate resin, a polyarylate resin, a polyphenylene ether resin, a polyphenylene sulfide resin, a polysulfone resin, a polyethersulfone resin, a polyether ether ketone resin and a polylactic acid resin.

Above all, in view of the balance between cost and physical properties (acid resistance, water resistance, impact resistance, and specific gravity), at least one kind selected from the group consisting of a polyamide resin, a polypropylene resin, a polycarbonate resin, and a polyphenylene sulfide resin is preferred, and from the viewpoints of impact resistance and a low processing temperature, at least one kind selected from the group consisting of a polypropylene resin and a polycarbonate resin is more preferred. Since polyamide resins have hygroscopic properties, polyamide resins may have insufficient long-term characteristics, and the characteristics may be deteriorated due to changes over time. It is preferable that the first thermoplastic resin is excellent in tight adhesiveness to the reinforcing fibers, and for example, in the case of using a resin that does not have a functional group having strong polarity, such as polypropylene, it is preferable that the first thermoplastic resin is subjected to graft modification from the viewpoint of enhancing the adhesiveness to the reinforcing fibers and to obtain higher strength as a laminated body.

Regarding a resin that has been subjected to graft modification, a graft-modified resin that is commonly used can be used. For example, a resin having a particular functional group having strong polarity at a position such as a terminal of an unmodified PP resin is used as a graft-modified resin. Regarding the functional group used for the graft modification, more specifically, an acid derivative such as an unsaturated carboxylic acid or an anhydride thereof, or a substance having an epoxy group can be used. Specific examples include maleic acid, fumaric acid, itaconic acid, acrylic acid, methacrylic acid, cis-4-cyclohexene-1,2-dicarboxylic acid, maleic anhydride, itaconic anhydride, cis-4-cyclohexene-1,2-dicarboxylic acid anhydride; a derivative of an acid ester or the like, such as an acid amide; a substance having an epoxy group; and a material having an acryl group. Among them, maleic anhydride, itaconic anhydride, and glycidyl methacrylate (GMA) may be mentioned. According to the present invention, maleic anhydride-modified polypropylene is preferably used.

In a case in which the first thermoplastic resin is a copolymer, the first thermoplastic resin may be any of a random polymer, a block polymer, or the like.

It is preferable that the first thermoplastic resin has a high molecular weight, and specifically, a mass average molecular weight is preferably 50,000 to 200,000. The mass average molecular weight is a measured value (calculated relative to polystyrene standards) of gel permeation chromatography (GPC). For example, in the case of measuring the molecular weight of a maleic anhydride-modified PP resin, an acid-modified polypropylene dissolved in o-dichlorobenzene is measured by high-temperature GPC (manufactured by Tosoh Corp., trade name: HLC-8220) at 145° C. using o-dichlorobenzene as an eluent.

The content of the first thermoplastic resin in the fiber-reinforced thermoplastic resin layer is not particularly limited, but it is preferably 10 to 45 mass %, and more preferably 20 to 35 mass %.

(Direction of Fiber Bundle in Layer)

In regard to the laminated body of the present invention, the fiber bundle present in a plurality of the fiber-reinforced thermoplastic resin layers may be laminated so as to be mutually in the same direction, or may be laminated so as to be in different directions.

(Organic Filler)

An organic filler may be dispersed in the fiber-reinforced thermoplastic resin layer (resin layer (1)). When an organic filler is dispersed in the fiber-reinforced thermoplastic resin layer, it is advantageous for the impact resistance of the laminated body.

The organic filler is a fibrous or particulate filler formed from an organic compound, and the organic compound can be appropriately selected from the group consisting of cellulose, a urea-formalin resin, a phenolic resin, a polycarbonate resin, a melamine resin, an epoxy resin, an unsaturated polyester resin, a silicone resin, a polyurethane resin, an acrylic resin, a fluororesin, a polystyrene resin, a formaldehyde resin, lignin, a petroleum resin, an amino resin, a polyester resin, a polyethersulfone resin, and copolymers of these. These are used singly or in combination of two or more kinds thereof.

Among these, a cellulose is preferable.

Regarding the organic filler, one that is not decomposed at the processing temperature of fusion bonding at the time of producing the fiber-reinforced composite resin material or the laminated body as will be described below is preferred. That is, an organic filler that is not decomposed at the processing temperature employed at the time of fusion bonding a second thermoplastic resin on at least one surface of the fiber bundle of reinforcing fibers impregnated with the first thermoplastic resin, or at the time of fusion bonding a plurality of fiber-reinforced composite resin materials (prepregs), each having a resin layer containing a second thermoplastic resin on at least one surface of a fiber-reinforced thermoplastic resin layer containing fiber bundle of reinforcing fibers and a first thermoplastic resin. When the organic filler is not decomposed at the processing temperature employed at the time of fusion bonding, a reinforcing effect is exhibited without being dissolved into the fiber-reinforced thermoplastic resin layer, and it becomes advantageous for the impact strength of the laminated body containing a fiber-reinforced resin.

For example, in a case in which the first and second thermoplastic resins are polypropylene-based resins, such as in a case in which the first thermoplastic resin is a graft-modified polypropylene resin and the second thermoplastic resin is a polypropylene resin, it is preferable that the organic filler is not decomposed at 120° C. or lower. When the organic filler is not decomposed at 120° C. or lower, the organic filler exhibits a reinforcing effect without being dissolved in the thermoplastic resins, which are polypropylene-based resins, and it works advantageously on the impact strength of the laminated body containing a fiber-reinforced resin.

The cellulose that is preferably used as the organic filler is fibrous cellulose, preferably plant fiber-derived cellulose, and particularly preferably fine plant fibrous cellulose (powdered pulp). The pulp is also a raw material for paper. From a chemical viewpoint, a primary constituent of the pulp is cellulose.

The plant fiber-derived cellulose is not particularly limited, and specific examples thereof include a material derived from plant, such as wood, bamboo, hemp, jute, and kenaf. In the present invention, a wood or a material derived from the wood is preferable, and a kraft pulp is particularly preferable. Meanwhile, the kraft pulp is a collective term of the pulp in which lignin-hemicellulose has been removed from a wood or a plant raw material by a chemical processing with caustic soda or the like, whereby almost pure cellulose has been extracted.

In the plant fiber-derived cellulose, from 30 to 40 molecules are bundled to form a high-crystalline micro-fibril having a micro-width of about 3 nm in diameter and a length of several hundred nm to several ten μm, and form a structure in which these are in a bundle through a soft non-crystalline portion. The powdered cellulose (pulverized pulp) used as a raw material is an aggregate in this bundle form.

Meanwhile, it is said that the micro-fibril is in the state that the constituent cellulose molecular chain extends itself and forms a chain crystal, whereby the micro-fibril exhibits an extremely high elastic modulus and has ideally an elastic modulus of nearly 140 GPa. Further, it is known that the elastic modulus of the cellulose increase with decreasing fiber diameter. Accordingly, in order to improve the properties of the laminated body containing a fiber-reinforced resin, its effectiveness increases with decrease in the fiber diameter and advancement in miniaturization of the cellulose dispersed in the thermoplastic synthetic resin.

The miniaturized cellulose is preferably a cellulose of a rod-like fiber.

A short side length (diameter) is preferably 2 μm or less, more preferably from 1 nm to 2 μm, more preferably from 3 nm to 1 μm, further preferably from 3 nm to 0.5 μm, and particularly preferably from 4 to 300 nm. On the other hand, a long side length (length) is preferably from 0.03 to 500 μm, and more preferably from 0.05 to 200 μm. An aspect ratio is preferably 5 or more, and more preferably 10 to 1,000. In addition, the aspect ratio is expressed in terms of a value obtained by dividing the average length by the average fiber diameter.

Further, in the present invention, as for the miniaturized cellulose, 15 mass % or more of the cellulose fiber to be contained preferably has a short side length of 2 μm or less. The content of the cellulose fiber having a short side length of 2 μm or less is more preferably 20 mass % or more, and further preferably 25 mass % or more.

Cellulose may be modified, and the cellulose may be an acid-modified cellulose or a cellulose modified by introducing functional groups into a portion of the cellulose skeleton.

The acid-modified cellulose may be, for example, a cellulose obtained by oxidizing —$CH_2OH$ that is formed from the carbon atom at the 6-position having a hydroxyl group of the β-glucose skeleton, into —COOH with an N-oxyl compound.

On the other hand, examples of the group modifying cellulose include functional groups such as an alkyl group, an acyl group, an acylamino group, a cyano group, an alkoxy group, an aryl group, an amino group, an aryloxy group, a silyl group, and a carboxy group, and the like. In the most general cases, any of the hydroxyl groups substituted at the 2-position, 3-position, and 6-position of the β-glucose skeleton is carboxymethylated.

Furthermore, it is also acceptable to modify cellulose in a form in which a modifying compound physically adsorbs to cellulose, without being chemically bonded thereto. Examples of the compound to be physically adsorbed include surfactants, and any of an anionic surfactant, a cationic surfactant, and a nonionic surfactant may be used; however, it is preferable to use a cationic surfactant.

The volume fraction of the organic filler in the fiber-reinforced thermoplastic resin layer is preferably 0.001% to 25%, more preferably 0.005% to 10%, and further preferably 0.01% to 5%.

When the volume fraction of the organic filler is too low, an effect of enhancing impact resistance cannot be obtained, and when the concentration of the organic filler is too high, dispersibility in the resin becomes poor so that impact resistance may be impaired.

<Resin Layer Containing Second Thermoplastic Resin (Resin Layer (2))>

(Second Thermoplastic Resin (C))

In regard to the laminated body of the present invention, the second thermoplastic resin to be included in the resin layer is not particularly limited, and specific examples include those resins mentioned above as the first thermoplastic resin. From the viewpoint of the physical properties (strength, elastic modulus, and impact resistance), an unmodified resin is preferred.

The content of the second thermoplastic resin to the resin layer containing the second thermoplastic resin is not particularly limited. However, the content is preferably 50 to 100 mass %, and more preferably 80 to 100 mass %.

<Constitution of Laminated Body>

The laminated body of the present invention means an integrated laminate designed so as to have a desired thickness through a process of piling plural sheets of the fiber-reinforced composite resin material of the present invention on each other and then subjecting them to a heat press or the like.

Examples of the shape of the laminated body include a tray shape, a cylindrical shape, and the like, although the shape varies depending on a member or the like, and is not limited to these. It is also possible to form a complicated 3-dimensional structure including concavity and convexity such as a rib, in conformity to the shape of the desired member.

(Combination of First Thermoplastic Resin and Second Thermoplastic Resin)

Regarding the combination of the first thermoplastic resin and the second thermoplastic resin, it is preferable that the second thermoplastic resin adjoining the first thermoplastic resin is a highly compatible resin, and it is more preferable that the first thermoplastic resin and the second thermoplastic resin are resins of the same kind. It is because since the thermoplastic resins are highly adhesive to each other and have excellent interlayer adhesiveness, the laminated body also has excellent strength. Examples of a combination of highly compatible resins include combinations of a polypropylene resin, a polyethylene resin, an acid-modified polypropylene resin (for example, maleic anhydride-modified polypropylene resin), an acid-modified polyethylene resin, and a polyolefin elastomer. Furthermore, the phrase "resins of the same kind" means that the chemical structures of the repeating units of the carbon skeleton forming the polymer main chain are identical to each other. Examples of a combination of "resins of the same kind" include a combination of a polypropylene resin and a polypropylene resin, a combination of a polypropylene resin and an acid-modified polypropylene resin, a combination of a polyethylene resin and a polyethylene resin, and a combination of a polyethylene resin and an acid-modified polyethylene resin.

From the viewpoints of interlayer adhesiveness and processability at the time of lamination, it is more preferable that the first thermoplastic resin and the second thermoplastic resin are all polypropylene resins; and from the viewpoint of the adhesiveness between the fibers and the resins, it is further preferable that the first thermoplastic resin is a graft-modified polypropylene resin and the second thermoplastic resin is a polypropylene resin.

(Thickness of Each Layer)

In regard to the laminated body of the present invention, the ratio ($S_A/S_C$) of the thickness of the fiber-reinforced thermoplastic resin layer (hereinafter, also simply described as "$S_A$") with respect to the thickness of the resin layer containing the second thermoplastic resin (hereinafter, also simply described as "$S_C$") is preferably 2.0 to 7.0 from the viewpoints of bending strength and impact resistance (shock absorption by the resin layer (2)). When the ratio is less than 2.0, it is difficult to obtain bending strength, and when the ratio is more than 7.0, it is difficult to obtain impact resistance. The ratio is more preferably 2.0 to 6.0, and further preferably 3.0 to 5.0.

The $S_A$ and $S_C$ are average values of the respective thicknesses of a plurality of the layers present within the laminated body. Regarding the details, measurement can be made by the method described in Examples that will be described below.

The above-described $S_A$ is not particularly limited, but it is preferably 50 to 300 μm, and more preferably 150 to 250 μm.

From the viewpoint that the laminated body of the present invention has a laminated structure and exhibits excellent impact resistance, the $S_C$ is preferably 20 to 150 μm, and more preferably 50 to 150 μm.

According to the present invention, for both the adjacent resin layer containing the second thermoplastic resin and the fiber-reinforced thermoplastic resin layer, it is preferable that the ratio of thicknesses of the layers satisfies the ratio of $S_A/S_C$ described above, and it is more preferable that in all of the resin layer containing the second thermoplastic resin and the fiber-reinforced thermoplastic resin layer, both of which exist as a plurality, the ratio of thicknesses of the layers satisfies the ratio of $S_A/S_C$ described above.

Furthermore, for both the resin layer containing the second thermoplastic resin and the fiber-reinforced thermoplastic resin layer, both of which exist as a plurality, it is preferable that the thickness of the layer satisfies the thicknesses described as $S_A$ and $S_C$.

(Bending Strength) The bending strength of the laminated body of the present invention is preferably 250 MPa or more, more preferably 350 MPa or more, and further preferably 500 MPa or more. The practical upper limit thereof is 1200 MPa or less. By having a bending strength in the range described above, the laminated body has excellent strength and rigidity. Such a laminated body is not easily destroyed in use applications where strength is required, and has excellent reliability. Particularly, in a case in which the laminated body has a large size, bending caused by the own weight of the laminated body is not likely to occur, and a laminated body having excellent strength can be obtained.

The bending strength of the laminated body is measured according to JIS K7074 by bending the fiber bundle such that the bending strength reaches the maximum, and performing a test.

Regarding the details, measurement can be made by the method described in Examples that will be described below.

(Fiber Volume Fraction)

The fiber volume fraction of the laminated body of the present invention is preferably 25 vol % or more, more preferably 35 vol % or more, and further preferably 45 vol % or more. The practical upper limit thereof is 70 vol % or less. Meanwhile, the unit vol % means percentage (%) by volume. When the laminated body has a fiber volume fraction in the range described above, both the bending strength and the impact resistance can be obtained in predetermined ranges.

Regarding the fiber volume fraction of the laminated body, the fraction of the reinforcing fibers in the laminated body is measured according to JIS K7075. Meanwhile, the reinforcing fibers may exist non-uniformly as long as they provide the effects of the present invention, and it is preferable that the reinforcing fibers exist uniformly.

Regarding the details, measurement can be made by the method described in Examples that will be described below.

(Bending Strength/Fiber Volume Fraction)

In regard to the laminated body of the present invention in which the directions of the fiber bundle are aligned in the same direction, the value of the bending strength with respect to the fiber volume fraction is preferably 10 MPa/vol % or more, more preferably 12 MPa/vol % or more, further preferably 15 MPa/vol % or more, and particularly preferably 17 MPa/vol % or more, from the viewpoints of the material cost and the cost-effectiveness of strength.

Generally, when the fiber fraction increases, strength or elastic modulus increases. However, in a case in which the adhesiveness between the resin and the carbon fibers is deteriorated, high bending strength may not be obtained despite a high fraction of carbon fibers. That is, in order to be able to say that desired bending strength and impact resistance are satisfied while cost is suppressed, and the adhesiveness between the carbon fibers and the resin (1) is satisfactory, it is preferable that the above-described value of the bending strength with respect to the fiber volume fraction is satisfied.

Furthermore, the laminated body of the present invention is such that since a resin layer is interposed between the fiber-reinforced thermoplastic resin layers, the density of fibers in the fiber-reinforced thermoplastic resin layers becomes high when compared with a fiber-reinforced resin having the same fiber fraction and having fibers uniformly dispersed therein. Therefore, the laminated body is likely to have higher bending strength than a uniformly dispersion body.

(Charpy Impact Strength)

The Charpy impact strength is preferably 85 kJ/m$^2$ or more, more preferably 90 kJ/m$^2$ or more, and further preferably 100 kJ/m$^2$ or more. In a case in which the Charpy impact strength is too low, the impact resistance is insufficient for application to collision energy absorption parts for automobiles, and the like. Meanwhile, in a case in which the Charpy impact strength is low, the interfacial adhesive force between the resin (1) and carbon fibers or between the resin (1) layer and the resin (2) layer is weak, and there is a possibility that it may become easier for destruction to occur. As an example, when the fiber density in the fiber layer calculated from the proportion of the fiber layer and the fiber fraction of the laminated body through an observation of a fiber perpendicular direction cross-section, is too high, the impact resistance may be deteriorated. Furthermore, since the impact strength and bending strength tend to be contradictory, in a case in which the Charpy impact strength is too high, the bending strength may be lowered. Accordingly, the upper limit of the Charpy impact strength is preferably 200 kJ/m$^2$ or less, and particularly preferably 150 kJ/m$^2$ or less.

The Charpy impact strength of the laminated body is measured according to JIS K7077 by performing a test in a direction perpendicular to the fiber direction of the fiber bundle in the laminated body. Regarding the details, measurement can be made by the method described in Examples that will be described below.

<<Fiber-Reinforced Composite Resin Material>>

The fiber-reinforced composite resin material of the present invention contains a resin layer containing a second thermoplastic resin on at least one surface of a fiber-reinforced thermoplastic resin layer containing a fiber bundle of reinforcing fibers and a first thermoplastic resin. The fiber-reinforced composite resin material of the present invention is integratedly laminated.

FIG. 3 is a schematic longitudinal section view showing a structure according to one embodiment of the fiber-reinforced composite resin material of the present invention.

As shown in FIG. 3, the fiber-reinforced composite resin material 100 of the present invention has a laminated structure in which a resin layer 4 containing a second thermoplastic resin is laminated on both surfaces of a fiber-reinforced thermoplastic resin layer 3 containing a fiber bundle 1B, in which a plurality of reinforcing fibers 1A is mixed in a predetermined direction (the bundled state is not shown in FIG. 3) and a first thermoplastic resin 2. Meanwhile, a structure in which a resin layer 4 containing a second thermoplastic resin is laminated on only one surface of a fiber-reinforced thermoplastic resin layer 3 is also acceptable.

With regard to the fiber bundle of reinforcing fibers, the first thermoplastic resin, the second thermoplastic resin, the fiber-reinforced thermoplastic resin layer, and the resin layer containing the second thermoplastic resin, the respective descriptions for the laminated body given above can be preferably applied, except for the matters that will be described below.

The thickness of the fiber-reinforced composite resin material is not particularly limited, and may vary with the filament diameter or the number of filaments of the fiber bundle. The thickness is preferably 0.05 to 1 mm. When the fiber-reinforced composite resin material is too thin, the weight per sheet is very small, and wrinkling or folding may occur as a result of wind blowing from the surroundings, so that handling is difficult. Thus, it may be difficult to obtain a uniform laminated body. When the fiber-reinforced composite resin material is too thick, the distance from the resin layer (2) to an adjacent resin layer (2), with a fiber-reinforced composite resin material being interposed therebetween, is lengthened. Therefore, it becomes difficult to obtain an effect of incorporating the resin layer (2). The thickness of the composite material is more preferably 0.1 to 0.5 mm, and further preferably 0.15 to 0.3 mm.

The cross-sectional shape of the fiber-reinforced composite resin material with respect to the direction of the fiber axis is not particularly limited, and may be a circle or rectangle.

<<Method of Producing Fiber-Reinforced Thermoplastic Composite Material>>

The method of producing a fiber-reinforced thermoplastic composite material of the present invention includes a step of fusion bonding a second thermoplastic resin on at least one surface of fiber bundle of reinforcing fibers impregnated with a first thermoplastic resin.

The details will be described below.

<Fiber Bundle of Reinforcing Fibers Impregnated with First Thermoplastic Resin>

Regarding the fiber bundle of reinforcing fibers impregnated with the first thermoplastic resin (hereinafter, also referred to as "fiber-reinforced material"), the shape of the fiber bundle is not particularly limited, and a tape form and a sheet form (UD sheet, nonwoven fabric, woven fabric, knitted fabric) may be mentioned. However, it is preferable that the fiber bundle is in a sheet form, from the viewpoint of fusion bonding the second thermoplastic resin.

The fiber-reinforced material can be obtained by an ordinarily method. Examples of a method of impregnating the fiber bundle of the reinforcing fibers with the first thermoplastic resin (hereinafter, also simply referred to as "first resin") include a method of heating and melting the first resin and impregnating the first resin into reinforcing fibers that have been subjected to papermaking (melt impregnation method), a method of using the film-like first resin by the melt impregnation method (impression method), a method of applying and fusion bonding the powdered first resin on reinforcing fibers that have been subjected to papermaking according to a fluidized bed method or a suspension method (powder method), a method of producing a solution of the first resin, impregnating reinforcing fibers that have been subjected to papermaking, and then removing the solvent (solution impregnation method), and a method of impregnating reinforcing fibers with the first resin in the form of an emulsion having the first resin dispersed in water (emulsion method). Among them, an impression method and an emulsion method are preferred, and in order to make the carbon fibers and the resin layer (1) uniform by means of high impregnability, it is more preferable to obtain the fiber-reinforced material by an emulsion method.

Regarding a specific example of the emulsion method, the following embodiment may be mentioned preferably.

(Emulsion Method)

The method includes:

a step (step 1) of soaking a fiber bundle, in which a plurality of reinforcing fibers has been lined up in a predetermined direction, in a first resin emulsion (hereinafter, also referred to as "emulsion"); and a step (step 2) of heating the fiber bundle after soaking at the temperature of a boiling point of the dispersion medium or higher and a melting point of the first resin+80° C. or less.

By performing the step 1, the fiber bundle is soaked in the first resin emulsion, thereby impregnating the emulsion into the fiber bundle. In a case in which a first resin that is lighter than water, such as polypropylene (specific gravity 0.9) is produced into a suspension, it is thought to be very difficult to maintain a uniform dispersion state in water for a long time period. In contrast, it is believed that when the first resin is used in the form of an emulsion, a uniform dispersion state is obtained stably, and the fiber bundle can be impregnated even with a first resin that is lighter than water, such as polypropylene.

By performing the step 2, the water which is a dispersion medium contained in the first resin emulsion is volatilized to dry.

In the step 1, by using a plurality of fiber bundle, a wide range of fiber-reinforced material may be also obtained.

In the step 1, the fiber bundle may be spread or may not be spread, but it is preferable that the fiber bundle is not spread.

In the step 1, the soaking time is preferably from 1 to 5 minutes.

The step 1 may contain a squeezing step for adjusting an amount of the first resin to be contained in the fiber bundle.

In the step 1, the first resin emulsion is preferably impregnated so that the amount of the first resin after the above-described soaking or the above-described adjustment is 60 to 140 g with respect to 100 g of the fiber bundle.

Examples of the drying means in the step 2 include a circulating hot air thermostatic oven, a heating furnace, a vacuum dryer, a pressing machine, a heating roller, and the like. In order to prevent the rumpling of the fiber itself, it is preferred to use a Labo-Press which is able to adjust a force applied to the fiber.

Further, the drying temperature is preferably set to a temperature of 100° C. or higher that is equal to or higher than the boiling point of water and a temperature that is, at a maximum, higher by 80° C. than a melting point $T_m$ of the first resin contained in the emulsion. In a case of drying at lower than 100° C., it takes a time for evaporation of water, whereby the production cost sometimes increases. Further, in a case of drying at a temperature that is higher than [a melting point $T_m$+80° C.], reduction of molecular weight due to deterioration (decomposition) of the first resin contained in the emulsion occurs, whereby the strength of the laminated body sometimes becomes insufficient, or uniformity of the product sometimes becomes insufficient due to increase in variation coefficient of the bending strength. Further, the drying temperature is more preferably a melting point $T_m$ of the first resin or higher and it is preferable that the first resin is at least partially fused.

The melting point $T_m$ of the first resin contained in the emulsion can be determined by a differential scanning calorimetry from the residue remained after drying the emulsion, although the measurement is not limited to this. More specifically, the melting point can be measured by the method described in Example described below.

In the fiber-reinforced material obtained by the step 2, the content of the first resin is preferably from 10 to 40% by mass.

In the present invention, in order to increase an adhesion force between reinforcing fibers and a first resin in the emulsion, a sizing agent, an oil, a paste, or the like, each of which is adhered to reinforcing fibers, can be removed before soaking of the emulsion. Further, if needed, preliminarily the reinforcing fibers may be subjected to a fiber spread treatment or to a surface treatment with electrolysis or chemicals.

(Emulsion of First Resin)

The emulsion of the first resin used in the emulsion method described above may include a dispersion medium and a first resin.

The emulsion of the first resin is in a state in which microparticles formed from a non-water-soluble first resin are stably dispersed in a dispersion medium. That is, this emulsion is in a form in which an aqueous phase (dispersion medium) serves as a continuous phase, and the first resin particles serves as a dispersed phase. When fiber bundle are impregnated with this emulsion and are subjected to the step 2 and a heating step, the dispersion medium in the emulsion is volatilized, and a fiber-reinforced material containing fiber bundle and the first resin is obtained.

The average particle size of the first resin microparticles is preferably 50 to 500 nm, and more preferably 100 to 300 nm. The average particle size can be determined by dispersing the first resin microparticles in an alcohol or water, and measuring the particle sizes using an optical particle size measuring machine such as a laser diffraction type particle size distribution analyzer.

It is preferable that the emulsion contains a basic substance. The emulsion may also include a polymer dispersant, an emulsifier, and the like.

Furthermore, the emulsion may also include, as additives, substances that can be removed by heating from a fiber-reinforced material, a reinforcing fiber thermoplastic composite material, and a laminated body in the production processes for these materials. It is preferable that the additives have been removed as far as possible in a completed laminated body.

One preferable type of an emulsion of the first resin is a polypropylene emulsion.

(Dispersion Medium)

As a dispersion medium, water or an aqueous medium (hereinafter, these are collectively called as "an aqueous medium") is used.

In the suspension method described in the JP-A-2008-44999, an organic solvent may be sometimes evaporated at the time of heating and drying of the suspension, or in an electrifying process for increasing an efficiency of the suspension to be adhered to a reinforcing fiber or for increasing uniformity of the adhesion amount. In contrast, water is used as a dispersion medium, it is possible to keep a lid on cost for maintenance and sustainment of the environment of worker safety.

Further, in order to improve affinity between the aqueous medium and the first resin (for example, polypropylene), the dispersion medium may contain a small amount of a hydrophilic organic solvent. There is a concern that if a hydrophilic organic solvent is present in the dispersion medium, the dispersion medium may interrupt a bond of the reinforcing fiber and the first resin, and therefore the smaller addition amount of the hydrophilic organic solvent is preferred.

(Basic Material)

In the preparation of the emulsion, the use of a basic substance is preferable for acceleration of emulsification or neutralization. Examples of the basic substance include sodium hydroxide, potassium hydroxide, sodium hydrogen carbonate, amines such as ammonia and organic amine compounds, and the like. Examples of the organic amine compounds include triethyl amine, N,N-dimethylethanol amine, isopropyl amine, iminobispropyl amine, ethyl amine, diethyl amine, 3-ethoxypropyl amine, 3-diethylaminopropyl amine, sec-butyl amine, propyl amine, methylaminopropyl amine, methyliminobispropyl amine, 3-methoxypropyl amine, monoethanol amine, morpholine, N-methyl morpholine, N-ethyl morpholine, and the like. These may be used in mixture. As the basic substance, sodium hydroxide, potassium hydroxide and an organic amine compounds are more preferred. Particularly preferred are potassium hydroxide, triethyl amine and N,N-dimethylethanol amine.

(High Molecular Dispersant)

As the high molecular dispersant, a high molecular dispersant that has a high affinity for an aqueous medium is preferred. Such high molecular dispersant includes a surfactant, for example, polymers of alkylene oxides represented by polyethylene oxide and polyethylene glycol; and esters of styrene-maleic anhydride copolymers and/or styrene-maleic acid copolymers. Only one kind of these polymers may be used, or two or more kinds thereof may be used.

(Emulsifier)

Examples of the emulsifier include an aliphatic acid, a nonionic surfactant, an anionic surfactant, and a cationic surfactant (however, the above-described basic substance is removed therefrom). Only one kind of these compounds may be used, or two or more kinds thereof may be used. Further, if the emulsifier is present in the emulsion, the strength or the elastic modulus may be sometimes lowered when formed as a laminated body, and therefore it is sometimes preferable that the emulsifier is not contained in the emulsion.

(Preparation Method of First Resin Emulsion)

The first resin emulsion can be prepared using an ordinarily method. For example, as described in Japanese Patent Nos. 3401088 and 4594231, the first resin emulsion can be prepared by adding a high molecular dispersant, an emulsifier, water, and the like to a first resin, and heating while stirring, and then cooling.

The first resin emulsion can be prepared using an ordinarily method. For example, as described in Japanese Patent Nos. 3401088 and 4594231, the first resin emulsion can be prepared by adding a high molecular dispersant, an emulsifier, an aqueous medium, and the like to a first resin, and heating while stirring, and then cooling.

The content of the first resin in 100% by mass of the thermoplastic resin emulsion is preferably from 5 to 50% by mass, more preferably from 10 to 40% by mass, and particularly preferably from 20 to 35% by mass. When the content of the first resin is from 5 to 50% by mass, the impregnation efficiency of the first resin into an interspace between reinforcing fibers can be improved, whereby an amount of the first resin to be adhered to the reinforcing fibers can be controlled to a preferred amount.

As the heating temperature, a range of a melting point of the first resin $T_m$ to $[T_m+80°$ C.] is preferable, and a range of a melting point of the first resin $T_m$ to $[T_m+50°$ C.] is more preferable.

(Analysis Method of Emulsion)

The use of the emulsion, as described above, ordinarily results in that additives such as the high molecular dispersant, the emulsifier, the basic substance, and the like are contained in the fiber-reinforced material. Therefore, the use of the emulsion when producing the fiber-reinforced material results in that the fiber-reinforced material includes components derived from the first resin, the high molecular dispersant, the emulsifier, and/or the basic substance, each of which is contained in the emulsion as a resin component (herein, the resin component means components other than the reinforcing fiber). In other words, in the case where, in addition to the first resin, components derived from the high molecular dispersant, the emulsifier, the basic substance, or the like were confirmed by analysis of the resin component in the laminated body or the reinforcing fiber thermoplastic composite material, one can judge that the first resin emulsion was used. Hereinafter, specific analysis methods are described. However, the method for making a judgement on whether an emulsion has been used in the laminated body or the reinforcing fiber thermoplastic composite material is not limited to the following analysis methods.

Analysis Method 1

A laminated body or a reinforcing fiber thermoplastic composite material is cut out at the vertical cross-section of the fiber and the cut-out material is buried within an epoxy resin and then is polished. After that, a surface polish is performed by the ion milling. The resultant cross-section is subjected to an elemental mapping by means of EPMA (Electron Probe MicroAnalyser) (JXA-8230, manufactured by JEOL Ltd.). By the elemental mapping, K element derived from potassium hydroxide (KOH), or Na element derived from sodium hydroxide (NaOH), each of which is used for pH adjustment of the emulsion, can be detected from a resin portion around the fiber.

Analysis Method 2

A laminated body or a reinforcing fiber thermoplastic composite material is cut out at the vertical cross-section of the fiber. A volatile element of the cut-out material, when heated at 300° C. for 10 minutes, is analyzed by means of GC-MS (Gas Chromatography-Mass Spectrometry) (JMS-Q1050GC, manufactured by JEOL Ltd.). By the analysis, ammonia or organic amine compounds (for example, dimethylamino ethanol) used as a dispersion stabilizer for the emulsion can be detected.

<Amount of Surfactant>

It is preferable that the reinforcing fiber thermoplastic composite material does not contain any of the above described surfactant. Examples of the surfactant include those recited as examples of the high molecular dispersant and the emulsifier described above. Herein, the expression "does not contain any of the surfactant" means that the content of the surfactant in 100% by mass of the reinforcing fiber thermoplastic composite material is 0.5% by mass or less. The content of the surfactant can be measured by a common mass spectrometry, for example, a nuclear magnetic resonance (NMR) method, or a gas chromatograph mass spectrometry (GC-MS) method, or can be calculated from the amount of fusion bonding of the first resin in the emulsion before impregnation and the thermoplastic resin of the second resin.

The content of the surfactant in the reinforcing fiber thermoplastic composite material can be controlled to the above-described range by adjusting (reducing) the content of the surfactant in the emulsion, or by heating the fiber-reinforced material or the reinforcing fiber thermoplastic composite material in the preparation thereof.

<Fusion Bonding of Second Thermoplastic Resin>

According to the present invention, a fiber-reinforced composite resin material in which a reinforcing fiber material and a second thermoplastic resin are integratedly laminated is obtained by a process of fusion bonding of the second thermoplastic resin (hereinafter, also simply referred to as "second resin") to the reinforcing fiber material.

Fusion bonding of the second resin can be carried out by an ordinarily method. For example, heat press forming, heat lamination method, a tape placement method, as well as general methods such as an autoclave method and a filament winding method, which are used for forming of carbon fibers; and general forming methods such as vacuum forming and match mold forming, which are related to forming of thermoplastic resins, can be adopted. In the present invention, heat press forming is preferred.

In regard to heat press forming, an embodiment of laminating a film of the second resin on at least one surface of the fiber-reinforced material, appropriately disposing the laminate within a hollow-shaped spacer or between male and female dies, and compression forming the laminate after pre-heating at a predetermined temperature, is preferred.

The conditions for heat press are not particularly limited as long as the second resin is fusion bonded; however, for example, in the case of a polypropylene resin, it is preferable to compress for 0.5 to 10 minutes under the conditions of 160 to 220° C. and 5 to 100 MPa. When the heat press temperature is too low, a uniform laminated body may not be obtained within a predetermined time period, and in a case in which the heat pressing temperature is too high, the polypropylene resin is thermally deteriorated within the time of heat pressing, so that desired bending strength may not be obtained. With regard to the heat pressing temperature, it is preferable that heat pressing is performed at a temperature higher than or equal to the melting point of the resin to be used, and from the viewpoint of fusion bondability between the resin layer (1) and the resin layer (2), it is preferable that heat pressing is performed at a temperature higher than or equal to the higher melting point between the respective melting points of the resin (1) and the resin (2). Furthermore, in a case in which fusion bonding is performed at a temperature higher than [melting point+80° C.], a decrease in the molecular weight caused by deterioration (decomposition) of the resins occurs, and there may be occasions in which the strength of the laminated body becomes insufficient, or the coefficient of variation of the bending strength increases, causing lack of uniformity in the laminated body.

By the process described above, the fiber-reinforced composite resin material of the present invention (hereinafter, also simply referred to as "prepreg"), in which a film of a second resin is laminated integrated on at least one surface of a fiber-reinforced material, can be obtained.

<<Method of Producing Laminated Body>>

The method of producing a laminated body of the present invention includes a step of fusion bonding a plurality of fiber-reinforced composite resin materials (prepregs), each having a resin layer containing a second thermoplastic resin on at least one surface of a fiber-reinforced thermoplastic resin layer containing a fiber bundle of reinforcing fibers and a first thermoplastic resin. Through this fusion bonding step, a laminated body in which a plurality of prepregs is integratedly laminated is obtained.

Specifically, multiple prepregs produced as described above are stacked such that the fiber-reinforced material and the second resin layer are alternately stacked. In the case of having the second resin layer on one surface of the fiber-reinforced material, the second resin layer is fusion bonded to the fiber-reinforced material of a different prepreg. Furthermore, in the case of having the second resin layer on both surfaces of the fiber-reinforced material, the second resin layers of different prepregs are fusion bonded. In this manner, the laminated body of the present invention can be produced.

Regarding the fusion bonding step, the embodiment described for fusion bonding of the second thermoplastic resin is preferably applied.

When a plurality of prepregs is laminated and fusion bonded, all the prepregs may be simultaneously fusion bonded, or fusion bonding may be carried out dividedly in several times.

Furthermore, when a laminated body is produced, the fiber-reinforced thermoplastic resin layers may be laminated by aligning the fiber directions of the resin layers in one direction, or the fiber-reinforced thermoplastic resin layers may be laminated by shifting the fiber directions by 45 degrees, or by shifting the fiber directions to be orthogonal, while designating the fiber direction of the outermost layer as 0 degrees.

When the prepregs are formed by lamination, the laminated body sometimes becomes relatively higher in terms of fiber volume fraction than the prepregs due to overflow of the resin content.

EXAMPLES

The present invention will be described in more detail based on examples given below, but the invention is not meant to be limited by these.

[Evaluation and Measurement Methods]
(1) Bending Test

A specimen having a size of 15 mm in width (transverse)× 100 mm in length was cut out from a laminated body molded to a thickness of 2 mm by the production method described above. For this specimen, a three-point bending test was performed using a universal material testing machine (manufactured by Instron Japan Company, Limited, trade name: INSTRON 5567). The distance between the supports was set to 80 mm, and the bending speed was set to 5 mm/min. Therein, from readout of a load at the point of the maximum load, the bending strength was calculated in conformity to JIS K7074. Incidentally, the arithmetic mean of the results of five specimens was designated as the bending strength.

(2) Fiber Volume Fraction

The void content and the fiber volume fraction (Vf) of the obtained laminated body were measured according to the combustion method described in JIS K7074 (A test method for fiber content and void content of a carbon reinforcing fiber plastic).

(3) Impact Resistance Test (Charpy Impact Test)

A specimen having a size of 10 mm in width (transverse)× 80 mm in length was cut out from a laminated body molded to a thickness of 2 mm by the production method described above. A Charpy impact test was carried out by applying a flatwise impact to this specimen, without inserting a notch into the specimen, using a hammer of 3 J of a digital impact testing machine (manufactured by Yasuda Seiki Seisakusho, Ltd., trade name: NO. 258-D) in a direction perpendicular to the face of the plate (in a direction perpendicular to the fiber direction of the laminated body). The test was performed at room temperature, the distance between the supports was set to 60 mm, and the Charpy impact strength was calculated according to JIS K7077. Incidentally, the arithmetic mean of the results of five specimens was designated as the Charpy impact strength.

(4) Measurement of Indentation Elastic Modulus Using Nano Indenter

The laminated body was cut in a direction perpendicular to the fiber direction of the fiber bundle (A) of reinforcing fibers using a precision low-speed cutting machine (manufactured by BUEHLER Holding AG, trade name: ISOMET 11-1180), and a sample having a width of 10 mm in the fiber direction was cut out. That was embedded in an epoxy resin, a fiber perpendicular direction cross-section was polished, and thus a sample for measurement was obtained.

For the sample for measurement thus obtained, the fiber perpendicular direction cross-section was designated as a measurement face using a nanoindenter (manufactured by Elionix, Inc., trade name: ENT-2100). Under the following conditions, the indentation elastic moduli of the first thermoplastic resin (B) portion and the second thermoplastic resin (C) portion were measured respectively at ten sites, and the averages were designated as the indentation elastic moduli. Meanwhile, the indentation elastic modulus $E_{IT\text{-}B}$ of the first thermoplastic resin portion in the cross-section of the laminated body is a value measured by selecting a portion of the first thermoplastic resin in the fiber-reinforced thermoplastic resin layer, using an optical microscope attached to the measuring apparatus.

(Measurement Conditions)
Temperature: Normal temperature (25° C.)
Indenter: Triangular pyramid having an intercristal angle of 65.03° (Berkovich indenter)
Measurement mode: Loading-unloading test
Maximum load: 1 mN
Retention time when maximum load is reached: 1000 msec
Loading speed, unloading speed: 0.1 mN/sec (5) Thickness of Each Layer The laminated body was cut in a direction perpendicular to the fiber direction of the fiber bundle (A) of reinforcing fibers using a precision low-speed cutting machine (manufactured by BUEHLER Holding AG, trade name: SOMET 11-1180), and a sample having a width of 5 mm in the fiber direction was cut out. That was embedded in an epoxy resin, a fiber perpendicular direction cross-section was polished, and thus a sample for measurement was obtained.

For the measurement sample thus obtained, a fiber perpendicular direction cross-section was observed using a SEM (manufactured by JEOL, Ltd., trade name: Scanning Electron Microscope JSM-6390LV). Then, the thickness $S_A$ of the fiber-reinforced thermoplastic resin layer and the thickness $S_C$ of the resin layer containing the second thermoplastic resin were measured and calculated according to the following criteria.

(Criteria)
$S_A$: Arithmetic mean of thicknesses of all fiber-reinforced thermoplastic resin layers measured and calculated in the manner described below
$S_C$: Arithmetic mean of thicknesses of all resin layers containing the second thermoplastic resin measured and calculated in the manner described below.

(Thickness of Fiber-Reinforced Thermoplastic Resin Layer)

For a layer containing fiber bundle (A) of reinforcing fibers, the distance from the reinforcing fibers at one edge of this layer to the reinforcing fibers on the opposite edge was measured at any arbitrary twenty sites in the width direction of the laminated body, and the arithmetic mean of the distances was designated as the thickness of the fiber-reinforced thermoplastic resin layer.

(Thickness of Resin Layers Containing the Second Thermoplastic Resin)

For a layer not containing fiber bundle (A) of reinforcing fibers, the distance from a point adjoining the reinforcing fibers at one edge of this layer to a point adjoining the reinforcing fibers on the opposite edge was measured at any arbitrary twenty sites in the width direction of the laminated body, and the arithmetic mean of the distances was designated as the thickness of the resin layer containing the second thermoplastic resin.

(6) Melting Point of the Resin Contained in the Emulsion

As to the melting point of the resin contained in the emulsion, the emulsion was left to stand in atmosphere for one night or longer in a draft controlled at 23° C., and then moisture was volatilized by air seasoning to obtain a residue. From 5 to 10 mg of the obtained residue was put into an aluminum pan and then was subjected to a differential scanning calorimetry (trade name: DSC-60, manufactured by Shimadzu Corporation). As a 1st RUN, the temperature rise was performed up to 200° C. and then the temperature was maintained for 5 min.; after that, the temperature was rapidly cooled to 40° C. Further, as a 2nd RUN, the temperature rise was performed up to 200° C. at the rate of 10° C./min starting from 40° C. A peak temperature of the endothermic peak was defined as a melting point $T_m$. In a case where a plurality of the endothermic peaks is seen in the temperature range of 40° C. to 200° C., a peak temperature at the higher temperature side was defined as a melting point $T_m$.

Example 1

(Preparation of Fiber-Reinforced Material)

A continuous carbon fiber tow (trade name: PYROFIL TRH50 60M, manufactured by Mitsubishi Chemical Co., Ltd., the number of filaments contained in the fiber bundle: 60,000, width 10 mm, a plurality of reinforcing fibers has been lined up in a predetermined direction (one direction)) was soaked in a metal vat filled with a modified polypropylene (PP) emulsion. Note that, as the modified PP emulsion, MGP-1650 (manufactured by Maruyoshi Chemical Co., Ltd., maleic acid anhydride-modified PP emulsion, $T_m$=139° C., PP content: 30% by mass, average particle size: 250 nm) was used.

Next, the continuous carbon fiber tow having the modified PP emulsion impregnated thereto was squeezed to remove an extra modified PP emulsion. After that, the thus obtained fiber tow was dried by a heat treatment (165° C., 3 min.), and then was cooled, thereby to prepare a tape-like fiber-reinforced material (width: 15 mm, thickness: 0.2 mm, fiber volume fraction Vf: 50%) in which the modified PP emulsion has been impregnated into the spaces between the continuous carbon fibers. The content of the modified PP emulsion in the obtained fiber-reinforced material was 85% by mass.

(Method of Producing Prepreg)

Next, one sheet of this tape-liked fiber-reinforced material was prepared, and a PP film (manufactured by Oji F-Tex Co., Ltd., trade name: ALPHAN PY-001) was laminated on one surface of the fiber-reinforced material. This was introduced into a mold having the same size as the specimen of JIS K 7074 and was subjected to thermal pressing for 5 minutes at a temperature of 180° C. and a pressure of 10 MPa. Thus, a prepreg having a thickness of approximately 0.2 mm was produced.

(Method of Producing Laminated Body)

Next, the number of sheets was adjusted so that the thickness of the laminated body before thermal pressing would be 2 mm, and 8 sheets of this prepreg were prepared. The prepregs were stacked and disposed such that the fiber directions of the fiber bundle in the respective fiber-reinforced materials were arranged in the same direction (parallel direction), and the fiber-reinforced material and the PP resin layer came alternately. This laminated body was put into a mold having the same size as the specimen of JIS K 7074, and after pre-heating for 10 min., a hot press forming was performed at 180° C. under a pressure of 10 MPa for 5 min., thereby to prepare an about 1.6 mm-thick laminated body.

Example 2

A laminated body was produced and evaluated in the same manner as in Example 1, except that a PP film (manufactured by Oji F-Tex Co., Ltd., trade name:

ALPHAN PY-001) was laminated on both surfaces at the time of producing a prepreg. The results as shown in Table 1 were obtained.

Example 3

Continuous carbon fiber tows (manufactured by Mitsubishi Chemical Corp., trade name: PYROFIL TRH50 60M, the number of filaments included in a fiber bundle: 60,000, width 10 mm, a plurality of reinforcing fibers are aligned in a predetermined direction (one direction)) and an acid-modified polypropylene molded into a film form (manufactured by DuPont de Nemours, Inc., trade name: FUSABOND P353) were stacked and pressed, and the fiber bundle were impregnated with the acid-modified polypropylene, thus being integrated. Furthermore, a PP film (manufactured by Oji E-Tex Co., Ltd., trade name: ALPHAN PY-001) was laminated on both outer sides of the prepreg. This was introduced into a mold having the same size as the specimen of JIS K 7074 and was subjected to thermal pressing for 5 minutes at a temperature of 180° C. and a pressure of 10 MPa. Thus, a prepreg having a thickness of approximately 0.25 mm was produced. Eight sheets of the prepreg were used, and a laminated body was produced and evaluated in the same manner as in Example 1. The results as shown in Table 1 were obtained.

Example 4

A laminated body was produced and evaluated in the same manner as in Example 1, except that a PP film (manufactured by Oji F-Tex Co., Ltd., trade name: ALPHAN PY-001) was laminated on both surfaces of the prepreg, two sheets being laminated on each surface, at the time of producing the prepreg.

Example 5

A laminated body was produced and evaluated in the same manner as in Example 1, except that a PP film (manufactured by Oji F-Tex Co., Ltd., trade name: ALPHAN PY-001) was laminated on both surfaces of the prepreg, four sheets being laminated on each surface, at the time of producing the prepreg.

Example 6

A tape-like fiber-reinforced material and a laminated body were produced and evaluated in the same manner as in Example 1, except that the modified PP emulsion used in Example 1 was changed to DB-4010 (trade name: ARROWBASE, manufactured by UNITIKA LTD., maleic anhydride-modified PP emulsion, $T_m$=153° C., PP content: 25% by mass, average particle size: 250 nm). The results as shown in Table 1 were obtained.

Example 7

A laminated body was produced and evaluated in the same manner as in Example 6, except that a PP film (manufactured by Oji F-Tex Co., Ltd., trade name: ALPHAN PY-001) was laminated on both surfaces at the time of producing a prepreg. The results as shown in Table 1 were obtained.

Example 8

A laminated body was produced and evaluated in the same manner as in Example 6, except that a PP film (manufactured by Oji F-Tex Co., Ltd., trade name: ALPHAN PY-001) was laminated on both surfaces of the prepreg, two sheets being laminated on each surface, at the time of producing the prepreg.

Example 9

A laminated body was produced and evaluated in the same manner as in Example 6, except that a PP film (manufactured by Oji F-Tex Co., Ltd., trade name: ALPHAN PY-001) was laminated on both surfaces of the prepreg, four sheets being laminated on each surface, at the time of producing the prepreg.

Comparative Example 1

A tape-like fiber-reinforced material and a laminated body were produced and evaluated in the same manner as in Example 1, except that the PP film used in Example 2 was changed to an acid-modified PP film molded into a film form (manufactured by DuPont de Nemours, Inc., trade name: FUSABOND). The results as shown in Table 2 were obtained.

Comparative Example 2

A tape-like fiber-reinforced material and a laminated body were produced and evaluated in the same manner as in Example 1, except that the PP film used in Example 3 was changed to an acid-modified PP film molded into a film form (manufactured by DuPont de Nemours, Inc., trade name: FUSABOND). The results as shown in Table 2 were obtained.

Comparative Example 3

A tape-like fiber-reinforced material and a laminated body were produced and evaluated in the same manner as in Example 6, except that the PP film used in Example 6 was changed to an acid-modified PP film produced by evaporating water in DB-4010 (manufactured by UNITIKA LTD., trade name: ARROWBASE, maleic anhydride-modified PP emulsion, $T_m$=153° C., PP content: 25% by mass, average particle size: 250 nm) and collecting residual resin. The results as shown in Table 2 were obtained.

Comparative Example 4

A tape-like fiber-reinforced material and a laminated body were produced and evaluated in the same manner as in Example 6, except that the PP film used in Example 7 was changed to an acid-modified PP film produced by evaporating water in MGP-1650 (manufactured by Maruyoshi Chemical Co., Ltd., trade name: maleic anhydride-modified PP emulsion, $T_m$=139° C., PP content: 30% by mass, average particle size: 250 nm) and collecting residual resin. The results as shown in Table 2 were obtained.

TABLE 1

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Reinforcing Fiber | Carbon fiber | Carbon fiber | Carbon fiber | Carbon fiber | Carbon fiber | Carbon fiber | Carbon fiber | Carbon fiber | Carbon fiber |
| First thermoplastic resin | MGP-1650 | MGP-1650 | FUSABOND | MGP-1650 | MGP-1650 | DB-4010 | DB-4010 | DB-4010 | DB-4010 |
| Second thermoplastic resin | PP | PP | PP | PP | PP | PP | PP | PP | PP |
| Thickness $S_A$ of fiber-reinforced thermoplastic resin layer [μm] | 163 | 156 | 161 | 194 | 160 | 253 | 231 | 260 | 250 |
| Thickness $S_C$ of resin layer [μm] | 31 | 67 | 96 | 87 | 92 | 37 | 76 | 90 | 110 |
| $S_A/S_C$ | 5.19 | 2.32 | 2.27 | 2.22 | 1.74 | 6.90 | 3.05 | 2.89 | 2.27 |
| Fiber volume fraction [vol %] | 56 | 53 | 47 | 45 | 32 | 57 | 53 | 48 | 45 |
| Bending strength [MPa] | 687 | 622 | 600 | 517 | 251 | 1044 | 950 | 816 | 652 |
| Charpy impact strength [kJ/m$^2$] | 110 | 126 | 90 | 137 | 150 | 85 | 100 | 110 | 120 |
| Indentation elastic modulus $E_{IT-B}$ of first thermoplastic resin in cross-section ($E_{IT-B} \times 10^3$ [N/mm$^2$]) | 3.6 | 3.6 | 4.6 | 3.6 | 3.6 | 5.2 | 5.2 | 5.2 | 5.2 |
| Indentation elastic modulus $E_{IT-C}$ of second thermoplastic resin in cross-section ($E_{IT-C} \times 10^3$ [N/mm$^2$]) | 2.0 | 2.0 | 2.2 | 2.0 | 2.0 | 2.1 | 2.1 | 2.1 | 2.1 |
| $E_{IT-B}/E_{IT-C}$ | 1.8 | 1.8 | 2.1 | 1.8 | 1.8 | 2.4 | 2.4 | 2.4 | 2.4 |
| Bending strength/Fiber volume fraction [MPa/vol %] | 12.2 | 11.7 | 12.8 | 11.5 | 7.8 | 18.2 | 18.1 | 17.1 | 14.4 |

Notes:
Examples 1 to 9 are respectively abbreviated as "Ex. 1" to "Ex. 9".

TABLE 2

|  | Comp. 1 | Comp. 2 | Comp. 3 | Comp. 4 |
|---|---|---|---|---|
| Reinforcing Fiber | Carbon fiber | Carbon fiber | Carbon fiber | Carbon fiber |
| First thermoplastic resin | MGP-1650 | FUSABOND | DB-4010 | MGP-1650 |
| Second thermoplastic resin | FUSABOND | FUSABOND | DB-4010 | DB-4010 |
| Thickness $S_A$ of fiber-reinforced thermoplastic resin layer [μm] | 220 | 230 |  | 236 |
| Thickness $S_C$ of resin layer [μm] | 17 | 13 |  | 29 |
| $S_A/S_C$ | 13.3 | 17.1 | — | 8.1 |
| Fiber volume fraction [vol %] | 55 | 46 | 65 | 54 |
| Bending strength [MPa] | 320 | 450 | 1071 | 310 |
| Charpy impact strength [kJ/m$^2$] | 70 | 70 | 65 | 60 |
| Indentation elastic modulus $E_{IT-B}$ of first thermoplastic resin in cross-section ($E_{IT-B} \times 10^3$ [N/mm$^2$]) | 1.4 | 2.2 | No resin layer | 1.5 |
| Indentation elastic modulus $E_{IT-C}$ of second thermoplastic resin in cross-section ($E_{IT-C} \times 10^3$ [N/mm$^2$]) | 1.5 | 1.6 | No resin layer | 2.1 |
| $E_{IT-B}/E_{IT-C}$ | 1.0 | 1.4 | — | 0.7 |
| Bending strength/Fiber volume fraction [MPa/vol %] | 5.8 | 9.8 | 16.5 | 5.7 |

Notes:
Comparative Examples 1 to 4 are respectively abbreviated as "Comp. 1" to "Comp. 4".

In Comparative Example 3, since a layer form was not observed, the layer thickness could not be measured.

From the results of Table 1, it was understood that the laminate bodies of Examples 1 to 9 that satisfied the specifications of the present invention had high Charpy impact strength and excellent impact resistance.

In contrast, the laminate bodies of Comparative Examples 1, 2, and 4 were all such that the ratio of $E_{IT-B}$ with respect to $E_{IT-C}$ did not satisfy the specifications of the present invention, the ratio of layer thicknesses was 8 or higher, and the laminate bodies had low Charpy impact strength and insufficient impact resistance.

Furthermore, the laminated body of Comparative Example 3 was such that the fiber-reinforced thermoplastic resin layer was spread so as to encroach on the second thermoplastic resin, and a laminated structure in which the resin layer $S_C$ could be recognized was not observed. This laminated body of Comparative Example 3 had low Charpy impact strength and insufficient impact resistance.

Incidentally, even in a case in which a resin other than a polypropylene resin (polyethylene, an acrylic resin, or vinyl acetate) was used as the first thermoplastic resin, and in a case in which reinforcing fibers other than carbon fibers (glass fibers, basalt fibers, or a woven fabric of carbon fibers) were used as the reinforcing fibers, the laminate bodies of the present invention exhibited excellent impact resistance.

The melt flow rates (MFR) [170° C., load 0.325 kg] of acid-modified PP pellets produced by evaporating water from the above-mentioned modified PP emulsions (MGP-1650 and DB-4010) and collecting residual resins, were measured. The melt flow rate of MGP-1650 was 82 g/10 min, and the melt flow rate of DB-4010 was 0.8 g/10 min.

Furthermore, the fiber-reinforced composite resin material of the present invention can be used for the laminated body of the present invention having excellent impact resistance, and the production method of the present invention can efficiently produce these fiber-reinforced composite resin material and laminated body.

Having described our invention as related to the present embodiments, it is our intention that the invention not be limited by any of the details of the description, unless otherwise specified, but rather be construed broadly within its spirit and scope as set out in the accompanying claims.

REFERENCE SIGNS LIST

1A Reinforcing fibers
1B Fiber bundle
2 First thermoplastic resin
3 Fiber-reinforced thermoplastic resin layer
4 Resin layer containing second thermoplastic resin
5 Resin
10A, 10B Laminated body
100 Fiber-reinforced composite resin material (prepreg)

The invention claimed is:

1. A laminated body, comprising a fiber-reinforced resin, wherein a fiber-reinforced thermoplastic resin layer (1) comprising a fiber bundle of reinforcing fibers and a first thermoplastic resin, and a resin layer (2) comprising a second thermoplastic resin, are alternately laminated, to form the fiber-reinforced resin, and
wherein a ratio of the indentation elastic modulus $E_{IT\text{-}B}$ of the first thermoplastic resin portion of the laminated body with respect to the indentation elastic modulus $E_{IT\text{-}C}$ of the second thermoplastic resin portion is 1.5 or more and 5.0 or less,
wherein a ratio of the thickness of the resin layer (1) with respect to the thickness of the resin layer (2) is 1.7 to 6.9.

2. The laminated body comprising a fiber-reinforced resin according to claim 1, wherein the value of the bending strength with respect to the fiber volume fraction in the laminated body is 10 MPa/vol % or more.

3. The laminated body comprising a fiber-reinforced resin according to claim 1, wherein the first thermoplastic resin and the second thermoplastic resin each are one kind or two or more kinds of resins selected from the group consisting of a vinyl chloride resin, a vinylidene chloride resin, a vinyl acetate resin, a polyvinyl alcohol resin, a polystyrene resin, an acrylonitrile-styrene resin, an acrylonitrile-butadiene-styrene resin, an acrylic resin, a methacrylic resin, a polyethylene resin, a polypropylene resin, a polyamide resin, a polyacetal resin, a polycarbonate resin, a polyarylate resin, a polyphenylene ether resin, a polyphenylene sulfide resin, a polysulfone resin, a polyethersulfone resin, a polyether ether ketone resin and a polylactic acid resin.

4. The laminated body comprising a fiber-reinforced resin according to claim 3, wherein the first thermoplastic resin is a graft-modified polypropylene resin, and the second thermoplastic resin is a polypropylene resin.

5. The laminated body comprising a fiber-reinforced resin according to claim 4, wherein the indentation elastic modulus $E_{IT\text{-}B}$ of the first thermoplastic resin portion is 2500 N/mm$^2$ or more and 7000 N/mm$^2$ or less, and the indentation elastic modulus $E_{IT\text{-}C}$ of the second thermoplastic resin portion is 1500 N/mm$^2$ or more and 3000 N/mm$^2$ or less.

6. The laminated body comprising a fiber-reinforced resin according to claim 4, wherein the Charpy impact strength of the laminated body is 100 kJ/m$^2$ or more and 200 kJ/m$^2$ or less.

7. The laminated body comprising a fiber-reinforced resin according to claim 1, wherein the reinforcing fibers are carbon fibers.

8. The laminated body according to claim 1, wherein an organic filler is dispersed in the fiber-reinforced thermoplastic resin layer (1).

9. The laminated body comprising a fiber-reinforced resin according to claim 8, wherein the organic filler is cellulose.

10. A fiber-reinforced composite resin material to be used for the formation of the laminated body comprising a fiber-reinforced resin according to claim 1, comprising:
a fiber-reinforced thermoplastic resin layer (1a) comprising a fiber bundle of reinforcing fibers and a first thermoplastic resin; and
a resin layer (2a) comprising a second thermoplastic resin on at least one surface of the fiber-reinforced thermoplastic resin layer (1a).

11. A method of producing the laminated body according to claim 1, comprising a step of fusion bonding of both of fiber-reinforced composite resin materials according to claim 10.

12. The method of producing the fiber-reinforced composite resin material according to claim 10, comprising the steps of:
impregnating a fiber bundle of reinforcing fibers with a first thermoplastic resin, thereby obtaining a fiber-reinforced thermoplastic resin layer comprising the fiber bundle of reinforcing fibers and the first thermoplastic resin; and
fusion bonding a second thermoplastic resin on at least one surface of the fiber-reinforced thermoplastic resin layer thus obtained.

* * * * *